Jan. 17, 1928.
R. W. MESSENGER
METHOD OF CUTTING CAN ENDS
Filed Dec. 29, 1926
1,656,794
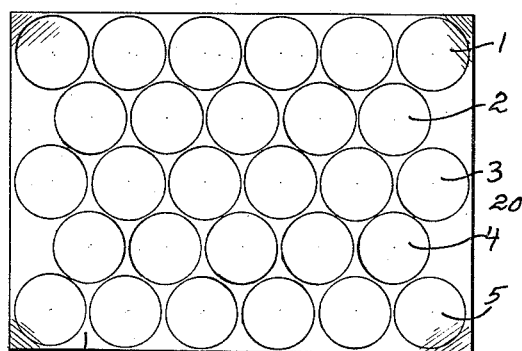
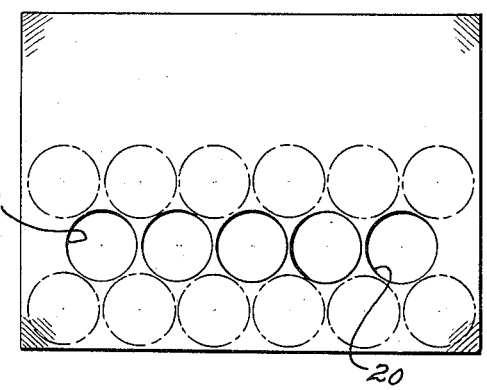
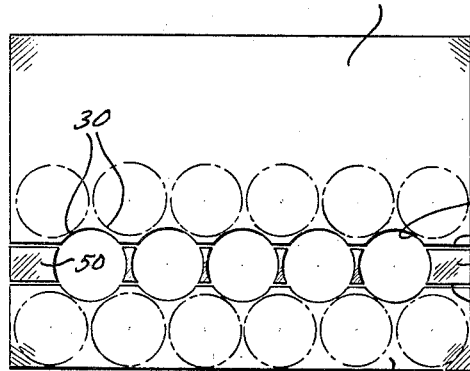
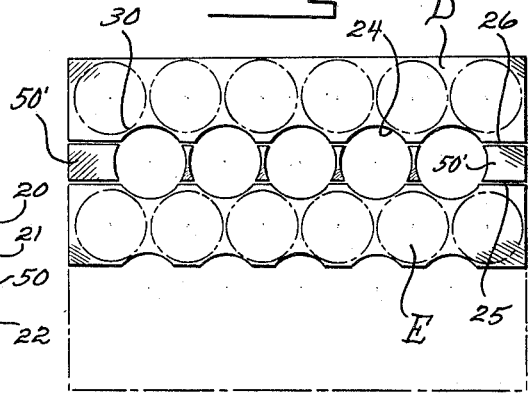
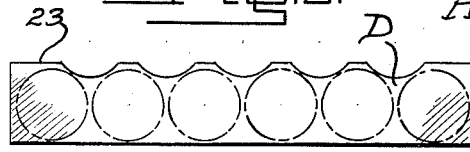
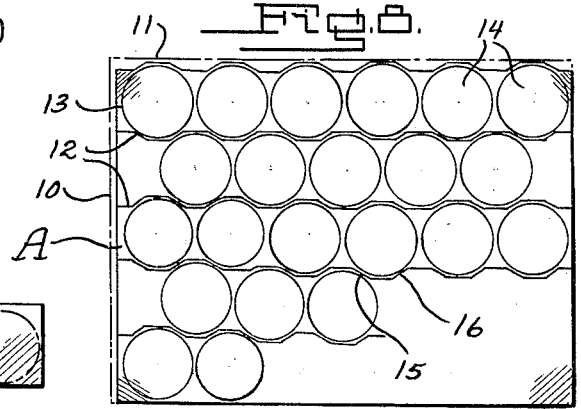
Inventor
Robert W. Messenger
By Lancaster and Allwine
Attorneys Patented Jan. 17, 1928.

1,656,794

UNITED STATES PATENT OFFICE.

ROBERT W. MESSENGER, OF POCOMOKE CITY, MARYLAND, ASSIGNOR TO ANNA Z. MESSENGER, OF POCOMOKE CITY, MARYLAND.

METHOD OF CUTTING CAN ENDS.

Application filed December 29, 1926. Serial No. 157,767.

The present invention relates to improvements in a method for cutting discs or round blanks from sheet metal, and particularly to a novel method for cutting can ends from tin plate.

The primary object of the invention is to provide an improved method of cutting can ends from commercial sheets of tin plate with a minimum amount of waste material.

A further object of the invention is to provide a method of cutting can ends from commercial sheets of tin plate, in a manner whereby the commercial sheet may be of less width than that required in existing methods of cutting can ends for producing of the maximum number of can ends from each sheet.

A further object of the invention resides in a method of cutting can ends from sheets of tin plate in a staggered arrangement, in a manner whereby the web or thread of metal between the openings formed by cutting of the can ends, is considerably less than that in any existing methods of cutting a series of can ends in staggered arrangement relative to each other.

A still further and important object of the invention resides in a novel method of cutting can ends from either trimmed or untrimmed commercial sheets as received from the tin mills.

Other objects and advantages of the invention will be apparent during the course of the following detailed description, taken in connection with the accompanying drawing forming a part of this specification and in which drawing:

Figure 1 shows a commercial sheet of tin plate laid out in a manner for the producing of a maximum number of can ends of a given size.

Figure 2 is a view illustrating the first step in the method of cutting can ends in staggered relation from the commercial sheet.

Figure 3 illustrates the second step in the method.

Figure 4 illustrates the fourth step in the method.

Figure 5 is a plan view of one of the recovery blanks of scrap pieces formed during the second and fourth steps of the method.

Figure 6 is a plan view of one of the side strips provided after completion of the second and fourth steps.

Figure 7 is a plan view of a strip formed after completion of the second and fourth steps and which strip before severance constituted the longitudinal center portion of the commercial sheet.

Figure 8 is a view of a commercial sheet showing a five row scroll lay-out as employed by present methods upon scroll shear machines.

As is well known, the commercial sheet of tinplate as received from the tin mill must guarantee to cut a given number of can ends of certain sizes, and these sheets are ordinarily of such size as to permit of cutting either 60 "No. 1 can ends", 46 "No. 2 can ends", 33 "No. 2½ can ends", or 28 "No. 3 can ends". In the example shown, the sheets have been laid out for the producing of the maximum number of can ends commonly known to the trade as "No. 3 can ends".

Referring first to the present method of producing can ends upon a scroll shear machine, and the sheet layout for which is illustrated in Figure 8, the dot and dash lines 10 and 11 at one end and one edge of the sheet respectively, designate the original margins of the sheet before being trimmed for presentation to the die press. After preliminary trimming of the sheets, the sheet is divided along the longitudinal scroll lines 12 into five independent strips 13, three of said strips being capable of having six can ends cut therefrom, and the remaining two strips being capable of having five can ends cut from each one. These strips 13 are then fed to a single die strip feed machine for cutting of the can ends as designated at 14. When severing the sheet A along the scroll lines 12, the space designated at 15 must be no less than one-eighth of an inch, in order that at least a clearance of one-sixteenth of an inch will be left between the edges of the strips 13 and the diagonal portions 16 of the scroll lines 12. This clearance of one-sixteenth of an inch is very essential for it is well known that if a die overlaps the edge of the strip so as to not produce a full sized can end, the die will soon be rendered useless. It will therefore be seen that a cutting along the scroll lines 12 must be very accurate so as not to cause any overlapping of the dies during cutting of the can ends from the strip. It will also be apparent that it is essential that the preliminary trueing up of the sheet be performed before feeding of the sheet to the scroll shear machine. It will further be apparent that with a method as illustrated in Figure 8, it is essential that the sheet when trimmed be of such width as to permit of at least a one-eight inch clearance between each of the strips 13 for allowing sufficient material when cutting of the can ends 14.

Referring now to the improved method of producing a maximum number of can ends from a commercial sheet of tinplate by the method disclosed herewith, the letter B designates a sheet of standard dimensions for producing a given number of round blanks or can ends. For the purpose of defining the method pursued, the sheet B has been shown laid out in five rows extending longitudinally of the sheet and numbered from 1 to 5 inclusive. As will be observed, the sheet B has been laid out for producing a maximum number of can ends, with the blanks aligning longitudinally of the sheet, or in the direction of feed of the sheet through the die press, and in staggered relation transversely of the sheet.

In the first step of the method, the sheet B is fed step by step through a single die press for cutting out the can ends from either of rows 2 or 4, and in the example illustrated in Figure 2, the can ends have been cut from row No. 4. As will be observed, the first cutting operation forms a row of openings 20 between one side row and the medial row of the sheet.

With the second step, and after the can ends have been cut from the row of openings 20, the sheet is sheared longitudinally on the lines 21 and 22 between the rows 3 and 5 for forming a sub sheet C, embodying rows 1, 2 and 3, and an edge strip D. This severing of the sheet B along the shear lines 21 and 22 automatically cuts the recovery blanks 50 which may be stacked for use in any manner desired. The shearing line 22 will provide a straight guide edge 23 along one edge of the strip D which constitutes row 5 of the commercial sheet.

The third step, is to feed the sub sheet C through the die press for cutting can ends from row 2, and which cutting of the can ends from row 2 will form a longitudinal row of openings 24 as illustrated in Figure 4. This third step is similar to the first cutting operation, and removes the can ends from a portion of the sheet in a manner whereby sufficient material is left at opposite sides of the row of openings 24 for the cutting of additional can ends from the sheet.

The fourth step, is to sever the sub-sheet C along the shear lines 25 and 26, with the shear lines traversing the openings 24 and providing recovery blanks 50' of identical formation as that of the recovery blanks 50. This severing of the subsheet C along the shear lines 25 and 26, provides an edge strip D' and an inner strip E, the edge strip D' to have No. 1 row of can ends cut therefrom, and the inner strip E to have the No. 3 row of can ends cut therefrom.

As a result of the four steps set forth, it will be seen that ten can ends have been formed, and that three strips have been formed from each of which six can ends may be cut.

The final step is to feed the strips D and E step by step through a single die strip feed machine for cutting of standard sized can ends therefrom and of a diameter equal to that of the can ends cut from the rows of openings 20 and 24.

By so first cutting alternate rows 2 and 4 from the sheet, the clearance as indicated at 30 in Figures 3 and 4, need only be approximately one-sixteenth of an inch, or one-half the width of the space 15 as employed in the scroll method illustrated in Figure 8. Thus is will be seen that when cutting No. 3 can ends, or 28 blanks from the standard sheet, this method saves one-sixteenth of an inch on each cut, or a total of one-quarter inch in the width of the standard sheet. Thus it will be seen that the commercial sheet required for producing 28 blanks or "No. 3 can ends", by this method may be one-quarter of an inch narrower than required for the forming of the same number of can ends by the present methods employed. In the producing of No. 2 can ends, and wherein 46 of the blanks are formed from a commercial sheet, the saving in width of the sheet will be still greater since when cutting these smaller can ends, the sheet is divided into seven longitudinal rows, and which would mean six one-eighth inch spaces similar to the space 15 as indicated in Figure 8.

From the foregoing description it will be apparent that a novel method for cutting discs or blanks from trimmed or untrimmed commercial sheets of tin plate or other sheet metal has been provided, wherein the commercial sheet may be of less area for the producing of a given number of discs, and resulting in a saving in the cost of producing the discs by a saving in material, and which method also results in the loss of a minimum amount of waste material when cutting the maximum number of discs from the sheet.

Various changes in the steps as set forth in this method of cutting can ends may be resorted to, without departing from the spirit of the invention or the scope of the following claims.

I claim:

1. The method of cutting can ends in a staggered arrangement from commercial sheets, consisting of cutting alternate rows of ends longitudinally of the sheets, severing the sheets longitudinally by double cuts between the uncut rows for simultaneous recovery of the waste blanks and separation of the uncut rows into end forming strips, and then cutting ends from the strips so formed.

2. The method of cutting can ends in a staggered arrangement from commercial sheets, consisting of cutting alternate rows of ends from the sheets by feeding of the sheets step by step to a die of a proper size for operation upon the sheets for producing a given number of can ends, severing the sheets between each uncut row for recovery of the waste blanks at each end of the cut out rows and separation of the uncut rows into end forming strips, and then feeding said strips step by step to a die of like size as that of the first mentioned die for cutting of ends from said strips.

3. The method of cutting can ends in a staggered arrangement from a commercial sheet, which consists in first feeding the sheet step by step to a single die press for cutting a row of ends spaced inwardly one row from one edge of the sheet; second, shearing the sheet along the cut out row into a sub sheet containing a number of end forming rows, and an end forming strip of one row; repeating said first and second operations upon the sub sheet for dividing the same into a number of independent end forming strips of one row each; and then feeding said strips step by step to a single die press for cutting of can ends therefrom.

ROBERT W. MESSENGER.